Jan. 14, 1941.  J. N. SHARMA ET AL  2,228,410
METHOD OF RETARDING DECAY OF FRESH FRUITS AND VEGETABLES
Filed June 30, 1939
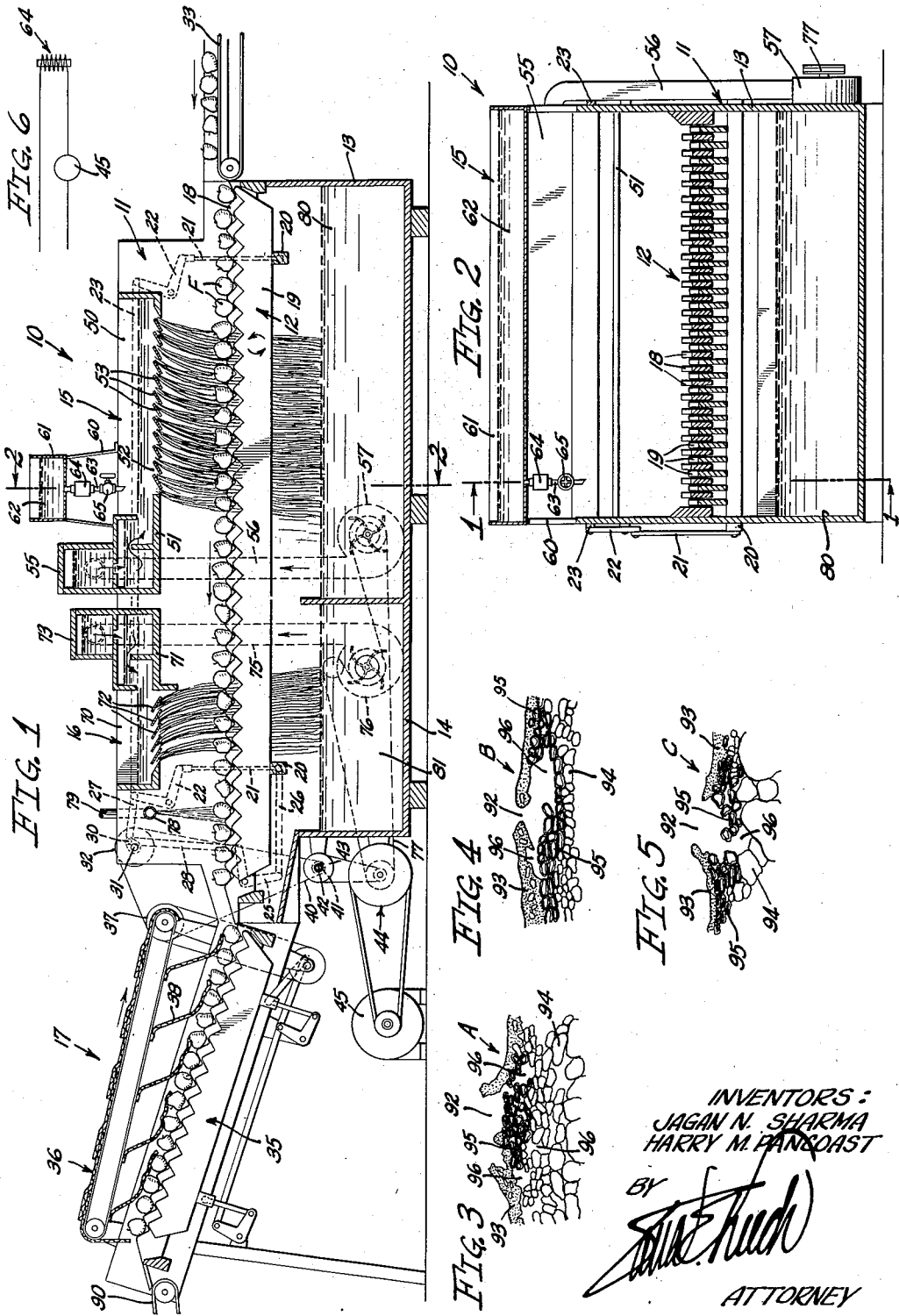
INVENTORS:
JAGAN N. SHARMA
HARRY M. PANCOAST
BY
ATTORNEY Patented Jan. 14, 1941

UNITED STATES PATENT OFFICE 2,228,410

METHOD OF RETARDING DECAY OF FRESH FRUITS AND VEGETABLES

Jagan N. Sharma, Los Angeles, and Harry M. Pancoast, Riverside, Calif., assignors to Food Machinery Corporation, San Jose, Calif., a corporation of Delaware Application June 30, 1939, Serial No. 282,223

6 Claims. (Cl. 99—156)

This invention relates to the art of preparing fresh fruit and the like for market and has for its principal object the destruction of decay organisms on the fruit to prevent the decay of the latter during storage, shipment and display of the fruit prior to its being ultimately consumed.

While the method of this invention may be used in the treatment of various fruits and vegetables, it is particularly adapted for and useful in the treatment of apples and for illustrative purposes it will be described herein as applied to this particular fruit.

The apple crop ripens, as a whole, within a relatively short span of time, and as it must be picked ripe it is necessary to store a large portion of the crop pending the opportunity to process and pack this for marketing. Much of each apple crop is thus stored for as long as three months between the picking and processing of the fruit, this delay being occasioned by the relatively small capacity of the equipment available for processing the fruit. When the fruit has been processed and packaged, it is further stored for indeterminate periods to facilitate the orderly flow of the crop to market. After the shipment of the fruit, at least several weeks are consumed in the transportation and distribution of the fruit before it reaches the ultimate consumer.

During the time which elapses between the picking of the apples and their ultimate consumption, a certain portion of the fruit decays and has to be thrown away. The amount of this decay has been reduced by treating processes developed with the object of destroying all the decay organisms present in the fruit at the time this is processed and packed but these have proved ineffective to eliminate heavy decay resulting from decay organisms inoculating the lenticels of the apples. During the season just past, lenticel decay has claimed as high as 20 per cent of many lots of apples arriving at market.

It is an object of the present invention to provide a method and apparatus for the treatment of apples to prevent decay originating in the lenticels thereof.

Lenticels appear on the surfaces of all varieties of apples as small, light colored spots, the number of these per apple varying from 450 to 800 in the case of Winesap apples and from 1500 to 2500 in the case of Spitzenberger apples. These lenticels perform the necessary natural function of permitting gas exchange through the skin of the apple generally referred to as breathing. Beginning as extremely small spots on the young apple, each lenticel develops until, in the mature apple, many of them constitute breaks in the skin of the apple, which is at least partially covered over with the natural wax constituting part of the outer cuticle of the apple and in most cases is sealed off on the inside of the skin by a layer of suberized hypodermal cells produced by the phellogen. The stretching of the skin of the apple as the latter grows tends to part the suberized cells last mentioned, with the result that decay organisms in the air have access to the adjacent hypodermal cells of the parenchyma, which are susceptible to destruction by decay organisms.

The apples, of course, remain on the trees until fully matured and for many weeks before the apples are picked the lenticels provide numerous cavities in the surface of the apples which are susceptible to inoculation by mold spores contained in the atmosphere. After the apples are picked and while they are stored pending their being processed and packed, the wax glands of the apple continue to produce wax which is added to the outer cuticle of the apple. This wax tends to close the surface openings of the lenticel cavities.

In attacking this problem, we have proceeded on the theory that after being inoculated with mold spores a number of the lenticel cavities are sealed off by the wax so that in order to prevent lenticel decay a means must be provided for penetrating all of the lenticel cavities with a suitable fungicide which will destroy all the decay organisms in these cavities. Difficulties which had to be overcome included the necessity for subjecting the mold spores to even the most powerful fungicide available for at least several hours in order to be certain of the killing of these spores, whereas these fungicides have a definite burning effect on apples so that if the entire surface of the apples is subjected to contact with substantial quantities of these fungicides for as much as several minutes, the apples are burned so as to destroy their marketability.

It is therefore another object of our invention to provide a method and apparatus for the treatment of apples to prevent lenticel decay in which it is possible to penetrate the waxy material sealing all of the infected lenticel cavities of the apple with a powerful fungicide and maintain this fungicide in contact with the infecting mold spores for a period of several hours without burning the apple.

We discovered that the foregoing objects can be achieved by employing in very small amounts a solvent of a particular character applied to the apples in an aqueous suspension for a limited period of time, this solvent containing a powerful fungicide in solution therein, and then, immediately following this treatment, rinsing all the treating agent from the fruit excepting for extremely minute portions of the solvent and fungicide which remain trapped in the lenticel cavities.

We discovered that for this solvent to be effective it must have sufficient solvent activity to penetrate the natural waxes of the outer cuticle of the apple which seal off certain of the lenticel cavities, thereby opening said cavities to treatment by the fungicide carried in the solvent.

We also discovered that this solvent must be of such a character as to resist its physical removal from the lenticel cavities by the rinse water which rinses off the excess treating agent from the apples and of such low volatility as to remain within the lenticels for a substantial period of time after the process has been applied to the fruit. The capacity of the solvent to remain within the lenticel cavities throughout the rinsing step of the treatment and for several hours thereafter results in the fungicide being held in solution and therefore active while contacting the mold spores inoculating these cavities throughout said period. In this way, the destruction of these mold spores is assured.

While there are a number of oil-soluble fungicides which might be used in conjunction with this solvent in the performance of our process, we have found orthophenylphenol to be superior to all other fungicides which were tried out in this process. Orthophenylphenol is a solid crystal except when in solution, and when out of solution is relatively inert with respect to the decay organisms infecting the lenticels. The importance in our process of the solvent being retained in the lenticels to keep the orthophenylphenol in solution for a period of several hours following the treatment is thus clear.

The manner of accomplishing the foregoing objects of the process and apparatus of the present invention, together with further objects and advantages thereof, will best be understood from a description of a preferred form of the process and apparatus embodied in the invention. For this purpose, reference is now had to the accompanying drawing, in which:

Fig. 1 is a diagrammatic longitudinal sectional view taken through a preferred embodiment of the apparatus of the invention.

Fig. 2 is a transverse sectional view taken on the line 2—2 of Fig. 1.

Fig. 3 is an enlarged section through a lenticel from a Rome Beauty apple, the suberization of the hypodermal cells of this lenticel taking place but not being complete, this lenticel thus being still functionally open.

Fig. 4 is an enlarged sectional view taken through a lenticel of a Golden Delicious apple in which cutinization has started over the exposed hypodermal layer.

Fig. 5 is an enlarged section through a lenticel from a Jonathan apple, in which a crack has developed which extends from outside of the apple to the large cells of the parenchyma.

Fig. 6 is a diagrammatic view illustrating the electrical wiring of the apparatus shown in Fig. 1.

Referring specifically to the drawing, a preferred embodiment of the apparatus of our invention is comprised in an apparatus 10 in which the apples are washed, rinsed and dried.

The apparatus 10 includes a frame 11 on which is provided a fruit conveyor 12, a treating agent tank 13, a rinse liquid tank 14, a treating agent flooding device 15, a rinse liquid flooding device 16 and a drier 17.

The conveyor 12 includes a series of parallel boards 18 which are disposed longitudinally of the machine over the tanks 13 and 14, and are rigidly fixed on the frame 11. Interspersed between the boards 18 is a series of boards 19 which are supported by cross members 20 and links 21 on belt cranks 22 which are connected together by a link 23 for a purpose which will be made clear hereinafter. Upper edges of the boards 18 and 19 are notched as shown in Fig. 1.

Pivotally connecting one of the cross members 20 to a pair of bell cranks 25 are links 26. The links 23 and bell cranks 25 are connected by links 27 and 28 to crank pins 30 provided on suitable cranks on a shaft 31. This shaft has a sprocket 32 for the purpose of rotating said shaft.

Fruit F is delivered to the conveyor 12 by a belt conveyor 33 and is discharged from the conveyor 12 onto a conveyor 35 in the drier 13 which is constructed and operated in substantially the same manner as the conveyor 12 which will be presently described. Located over the conveyor 34 is a travelling toweling device 36 driven by a sprocket 37 so as to drag towels 38 upwardly over the fruit F as this is conveyed on the conveyor 35. The conveyor 35 is also driven by the sprocket 37 which is rotated by a chain 40, the latter passing around the sprocket 37, sprocket 32 and a sprocket 41 which is mounted on a jack shaft 42 having a sprocket 43. The sprocket 43 is rotated through a transmission 44 by an electric motor 45.

The flooding device 15 includes a weir box 50, the floor 51 of which has an opening 52 occupied by a series of plate glass bars 53 set obliquely in parallel relation with each other as shown in Fig. 1. Provided at one end of the weir box 50 is a sluice box 55 to which treating liquid is adapted to be delivered from the tank 13 through a pipe 56 connected to a pump 57 which is mounted on the wall of said tank. Supported on legs 60 of the weir box 50 is a reservoir 61 for holding the supply of solvent and fungicide, 62. This reservoir is provided with a drip pipe 63 having a solenoid shut-off valve 64 and a regulating valve 65. The solenoid of the valve 64 is included in the circuit of the electrical motor 45 as shown in Fig. 6 so that when this circuit is open valve 64 is closed. The rinse device 16 includes a rinse weir box 70, the bottom 71 of which has weir plates 72 set obliquely in parallel relation for the discharge of water therebetween. Under one end of the weir box 70 is a sluice box 73 for delivering liquid to the weir box, the sluice box being adapted to have water delivered thereto from the tank 14 through a pipe 75 which connects with a pump 76 installed in the side wall of said tank.

The pumps 57 and 76 are driven from the transmission mechanism 44 by a chain 77.

Mounted on the frame 11 and extending across the apparatus 10 following the rinse device 16 is a final rinse manifold 78 having perforations for discharging rinse liquid downwardly, this liquid being supplied to the manifold 78 by a pipe 79.

The apparatus 10 may be operated in the performance of the method of our invention, as follows:

In preparing to start the apparatus 10, the tank 13 is filled with an aqueous treating agent 80 which comprises a mixture of water, oil and fungicide. As already stated, the fungicide which has been found most suitable for the purpose of killing the mold spores in the lenticels is orthophenylphenol. The compound is soluble in oil and the oil acts as a vehicle for the fungicide as well as a solvent for penetrating the waxy cuticle of the apples so that the fungicide may reach the mold spores which are buried in the interstices of the lenticels. We have found it necessary to have a solvent oil which is relatively nonvolatile, yet which is substantially of the consistency of water. A petroleum distillate of this general character which is below the distillation range of the lubricating oil brackets has been found entirely satisfactory. The oil of this type which we have selected as preferable is a highly refined petroleum distillate having essentially the following properties.

| | |
|---|---|
| Specific gravity | .775–.785 |
| Saybolt viscosity at | 100° F. 30 sec. |
| Flash point | 170° F. to 180° F. |
| Initial boiling point | 370° F. to 390° F. |
| Distillation end point | 480° F. to 500° F. |
| Unsulphonated residue | Above 97% |

The preferable solvent above specified is especially desirable in the performing of the method of our invention in that there is a relatively small amount of sulphonated matter contained in this oil. While other oils than the particular oil specified may be used with varying degrees of success, we have found that where the oil employed is a relatively volatile oil such as gasoline or benzine, this is too easily washed from the lenticels by the rinse water and it is thus difficult to wash off enough of the treating agent from the fruit to prevent the fruit from burning without carrying with the rinse water the major portion of the solvent and fungicide which has penetrated the lenticels.

On the other hand, we have found that inferior results are produced where a solvent oil is used which runs into the brackets of light lubricating oil as this oil is too viscous to adequately penetrate the small interstices into which the fungicide must be carried and is also too heavy to adequately rinse off the outer surface of the peel in the rinsing step of the process. Furthermore a petroleum distillate in the lubricating brackets is insufficiently active as a solvent to penetrate the natural waxes in the skin of the apples so as to deliver the fungicide into contact with the mold spores in the lenticels and other interstices in the skin of the fruit which are sealed over by this wax.

The term "lubricant brackets" is used to embrace those fractions in petroleum which have an oily consistency and the viscosity of which is above Saybolt 80 at 100° F.

While the process of our invention may be performed with the treating agent 80 at room temperature, or at the temperature of tap water, suitable means (not shown) may be provided for maintaining the temperature of the treating agent at any desired value at which the particular treating agent employed may be safely used on the fruit.

The preferable proportions of the fungicide to the solvent and of the solvent to the water in the treating agent 80 will be explained hereinafter.

The apparatus 10 having been charged with treating liquid 80 and rinse water 81 and the manifold 78 having been furnished with a supply of water under pressure through the pipe 79 so as to cause a forcible downward spray of fresh water from this manifold, the motor 45 is energized so as to rotate the impellers of the pumps 57 and 76 and rotate the shaft 31, the latter functioning through the linkage connecting the crank pins 30 to the bell cranks 25 and 22 to give the cross members 20 and the boards 19 supported thereon a rotary motion in the plane of these boards, this motion tending to lift any apples or fruit which may be resting on the boards 18 and progress these forwardly through the apparatus 10. The pump 57, when thus set in motion, draws treating agent 80 from the tank 13 and discharges this upwardly through the pipe 56 into the sluice box 55, from where this flows rapidly out into the weir box 50 over the weir plates 53 from between which the treating agent pours downwardly in sheets onto the conveyor 12 and any apples which may be resting on the latter. The pump 76, when started, operates to draw rinse water 81 from the tank 14 and discharge this upwardly through the pipe 75 into the sluice box 73 from which this water flows into the weir box 16 and gravitates downwardly through the bottom of this past the weir plates 72 onto the conveyor 12 or any fruit which may be supported on the latter.

When operation of the apparatus 10 has thus been started, a stream of fruit is fed over the conveyor 33 onto the right hand or receiving end of the conveyor 12 as shown in Fig. 1. This fruit is caused to progress by the rotary motion imparted to the boards 19 of the conveyor from the right hand end of the latter until this is discharged from the left hand end of this conveyor onto the right hand end of the conveyor 35 of the drying unit 17. The latter device is also set in operation when the motor 45 is started so that any fruit delivered to the drying device progresses upwardly along the conveyor 35 and is wiped with the towels 38 to remove all the moisture adhering to the outer surface of this fruit. After passing through the entire apparatus 10, the fruit is discharged from the drier 17 onto a conveyor 90 which carries it to the packers who pick this fruit up manually, wrap it and pack it in shipping cases.

Being in the circuit of the motor 45, the solenoid valve 64 is opened by starting the motor 45 and remains open only as long as this motor continues running. Thus, a controlled amount of solvent and fungicide is fed into the treating liquid 80 so long as this motor runs. The amount of solution thus fed replaces the oil which adheres to the fruit passing along the conveyor 12 so as to be removed from the treating liquid 80. In this manner, the amount of solvent and fungicide contained in the treating liquid 80 is maintained at a substantially uniform value.

There are essentially five factors which influence the results in performing the process of our invention and which are susceptible to variation to meet changing conditions in the fruit treated. For treating any given lot of fruit, a variation in the value of one of these factors requires an opposite variation in one or more of the other factors to obtain substantially similar treatment of the fruit. These factors are 1. The proportion of oil to the amount of water employed in the treating agent.
2. Rate of application of treating agent to the fruit.
3. Concentration of fungicide in the oil.
4. Temperature of the treating agent.
5. Time of treatment.

The volume of oil in proportion to the amount of water used in the treating agent varies between 0.5% and 2%.

The application of the treating agent to the fruit may be varied in the process of our invention from a slight dripping of this agent onto the fruit to a veritable deluge of the treating agent flooded from the weir box 50 downwardly onto the fruit as the latter travels along the conveyor 12. The treating agent, after being thus delivered onto the fruit, of course, drains quickly downwardly between the boards 18 and 19 into the tank 13. It is preferable, of course, that the treating agent be applied by the flood system as illustrated in the apparatus 10 with a fairly heavy flooding of the treating agent onto the fruit.

The concentration of fungicide in the oil preferably varies from 2 oz. per gallon of oil to 12 oz. per gallon of oil. On a percentage basis calculated according to weight, the fungicide is found to constitute approximately from 2% to 12% of the weight of the oil.

The process of this invention may be conducted at room temperatures or any temperature up to approximately 125° F., yet it is preferably carried on at a uniform temperature somewhere between 70° F. and 100° F.

While the other factors may be manipulated so as to widely vary the time period which the treating agent may be applied to the fruit in our process and still get good results, we have found it preferable to apply the treating agent not less than 10 seconds nor more than 60 seconds.

Examples of the values which may be given the above noted factors in the commercial performance of our invention, are set forth as follows:

Example I
1. Volume of oil_____ 1% of treating agent
2. Concentration of fungicide___ 5% by weight of the amount of oil
3. Temperature_____ 90° F.
4. Time_____ 30 seconds

Example II
1. Volume of oil_____ 1% of treating agent
2. Concentration of fungicide___ 5% by weight of the amount of oil
3. Temperature_____ 70° F.
4. Time_____ 55 seconds

Example III
1. Volume of oil_____ 1.5% of treating agent
2. Concentration of fungicide___ 5% by weight of the amount of oil
3. Temperature_____ 70° F.
4. Time_____ 30 seconds

Example IV
1. Volume of oil_____ 0.5% of treating agent
2. Concentration of fungicide___ 5% by weight of the amount of oil
3. Temperature_____ 100° F.
4. Time_____ 30 seconds The magnified views of Figs. 3, 4 and 5 which were taken of lenticels in three different kinds of apples, clearly illustrate the difficulty of the problem solved by the present invention. Although the lenticels A, B and C here illustrated differ in character, each is shown to constitute an opening 92 in the outer cuticle 93 of the apple, access through the opening 92 to the hypodermal layer 94 being partly or wholly covered by a suberized layer of hypodermal cells 95. Each of the lenticels A, B and C has inner cavities 96 which are partially or wholly surrounded by the layer 95 and the waxy outer cuticle 94. It is in these cavities that mold spores lodge during the development of the fruit where they are so protected from the treating fluid that it has heretofore proved impossible to reach these mold spores and destroy them and thus substantially eliminate decay which starts in the lenticels.

The method of our invention reaches the mold spores trapped in the lenticels by the use of a solvent which will penetrate through the thin portions of the waxy cuticle 94 at the lenticels so as to enter all of the cavities 96 and cover the surface of these cavities with a solution of the fungicide. The solution is also absorbed somewhat by the suberized cork-like layers 95 so that the fungicide reaches all the interstices in the lenticels which could possibly be impregnated with mold spores.

The process of our invention is exceptionally effective in that the solution of fungicide not only reaches all the interstices of the lenticels which are subject to infection by mold spores, but because the solvent employed in our process resists dispersion or evaporation from the lenticels of the apple until the lapse of such a period as to assure the killing of the decay organisms contacted.

Other fungicides besides orthophenylphenol which have been employed in our process have proved substantially less effective lethal agents with the exception of chlor orthophenylphenol although it was more difficult to prevent fruit injury with the latter fungicide than when using orthophenylphenol.

The apparatus 10 is similar to that shown in the patent to Moe, No. 1,983,478 issued December 4, 1934, on Method of and apparatus for cleaning fruit. The method covered by this patent is for washing spray residue from apples. The apparatus 10 can be used to carry out this method and when thus used, applies an aqueous solution of acid solvent for the spray residue through the flood device 15 and then rinses this from the fruit by applying fresh water through the rinse liquid flood device 16.

The process of our invention is capable of being used conjointly in the apparatus 10 with the spray residue removal process covered by the above noted Moe patent. The solvent most suitable for removal of spray residue from apples is a mild solution of hydrochloric acid and when the two processes are used together this acid is dissolved in the water included in the treating liquid 80 of our process. When this is done, and the apples are run through the apparatus 10 both to be washed and to be treated by the decay retarding process of our invention, the solvent oil used in our process not only performs its function of penetrating the lenticels and thus admitting orthophenylphenol to the internal cavities of the lenticels, but it also penetrates the wax in the stem and blossom ends of the fruit so as to facilitate the action of the acid in removing the spray residue from these portions of the fruit which are particularly difficult to clean.

While in the foregoing we have confined ourselves, for illustrative purposes, to a particular form of the process and apparatus of our invention and to preferred ranges as to the ingredients and critical factors relating thereto, it is to be understood that various modifications and changes may be made in the process and apparatus as described and that the invention includes all such changes and modifications as come within the scope of the appended claims.

What we claim is:

1. The method of treating fresh whole fruit to inhibit decay thereof, which includes the step of contacting said fruit with an aqueous treating agent containing the following ingredients in approximately the following proportions: A relatively non-volatile petroleum distillate, lighter than the lubricating oil brackets, (20 parts); orthophenylphenol, (1 part); water, (1979 parts); and rinsing the excess treating agent from the fruit.

2. In a method of treating fresh whole fruit to inhibit decay thereof, the steps of contacting said fruit with an aqueous treating agent containing not to exceed 3% by volume of a petroleum distillate having a distillation range of about 300° F. to 600° F. and an oil-soluble fungicide amounting to about 2% to 12% by weight of the amount of said distillate, said contact being maintained for a period of from about 10 to 90 seconds; and rinsing the excess treating agent from said fruit.

3. In a method of treating fresh whole fruit to inhibit decay thereof, the steps of washing said fruit with an aqueous treating agent containing less than 3% of a relatively non-volatile petroleum distillate, lighter than the lubricating oil brackets, said distillate containing an oil soluble fungicide; and rinsing the excess treating agent from said fruit.

4. In a method of treating fresh whole fruit to inhibit decay thereof, the steps of contacting said fruit with an aqueous treating agent containing less than about 3% of a relatively non-volatile petroleum distillate, lighter than the lubricating oil brackets, said oil containing a quantity of orthophenylphenol which does not exceed 12% by weight of said distillate; and rinsing the excess treating agent from said fruit.

5. In a method of treating fresh whole fruit to inhibit decay thereof, the steps of contacting said fruit with an aqueous treating agent containing not to exceed 3% by volume of petroleum distillate having a distillation range of about 300° F. to 600° F. and a quantity of orthophenylphenol amounting to about 2% to 12% by weight of the amount of said distillate, said contact being maintained for a period of form about 10 to 90 seconds; and rinsing the excess treating agent from said fruit.

6. In a method of treating fresh whole fruit to inhibit decay thereof, the steps of contacting said fruit with an aqueous treating agent containing less than 3% of a relatively non-volatile petroleum distillate, lighter than the lubricating oil brackets, said distillate containing orthophenylphenol; and rinsing the excess treating agent from said fruit.

JAGAN N. SHARMA.
HARRY M. PANCOAST.